United States Patent [19]

McDermott et al.

[11] Patent Number: 4,667,854
[45] Date of Patent: May 26, 1987

[54] LIQUID DISPENSER

[75] Inventors: Peter B. McDermott, Boonton; Gerald M. Syrek, Saddle Brook, both of N.J.

[73] Assignee: Ecolab Inc., St. Paul, Minn.

[21] Appl. No.: 725,262

[22] Filed: Apr. 19, 1985

[51] Int. Cl.⁴ .................. B65D 35/28; B65D 37/00
[52] U.S. Cl. ................................. 222/101; 222/181; 222/182; 222/209; 222/213; 222/214; 222/105; 417/476
[58] Field of Search ............... 222/207, 209, 212, 213, 222/214, 105, 181, 182, 185, 101, 102, 103, 372, 380, 494, 566; 417/474, 476, 477, 478

[56] References Cited

U.S. PATENT DOCUMENTS

| | | |
|---|---|---|
| 3,241,726 | 3/1966 | Chester ........................... 222/212 |
| 3,248,013 | 4/1966 | Bekhor ........................... 222/101 X |
| 3,685,680 | 8/1972 | Tenckhoff et al. ............. 222/372 X |
| 3,870,201 | 3/1975 | Asplund ........................... 222/207 |
| 3,881,641 | 5/1975 | Pliml, Jr. et al. ............... 222/207 |
| 4,101,057 | 7/1978 | Lo Maglio ....................... 222/207 |
| 4,178,975 | 12/1979 | Crespi ............................ 222/207 X |
| 4,238,056 | 12/1980 | Tucker et al. .................. 222/181 |
| 4,349,133 | 9/1982 | Christine ....................... 222/207 X |

Primary Examiner—Robert J. Spar
Assistant Examiner—Jay I. Alexander
Attorney, Agent, or Firm—Merchant, Gould, Smith, Edell, Welter & Schmidt

[57] ABSTRACT

A dispenser for use particularly with viscous liquids which has a housing having positioned therein a collapsible reservoir for the liquid, a dispensing tube extending from the reservoir and positioned in front of a rolling member, and a front bar member which when pushed, causes the rolling member to contact the top of the dispensing tube and roll therealong to dispense predetermined, controlled amounts of liquid from the reservoir.

15 Claims, 13 Drawing Figures

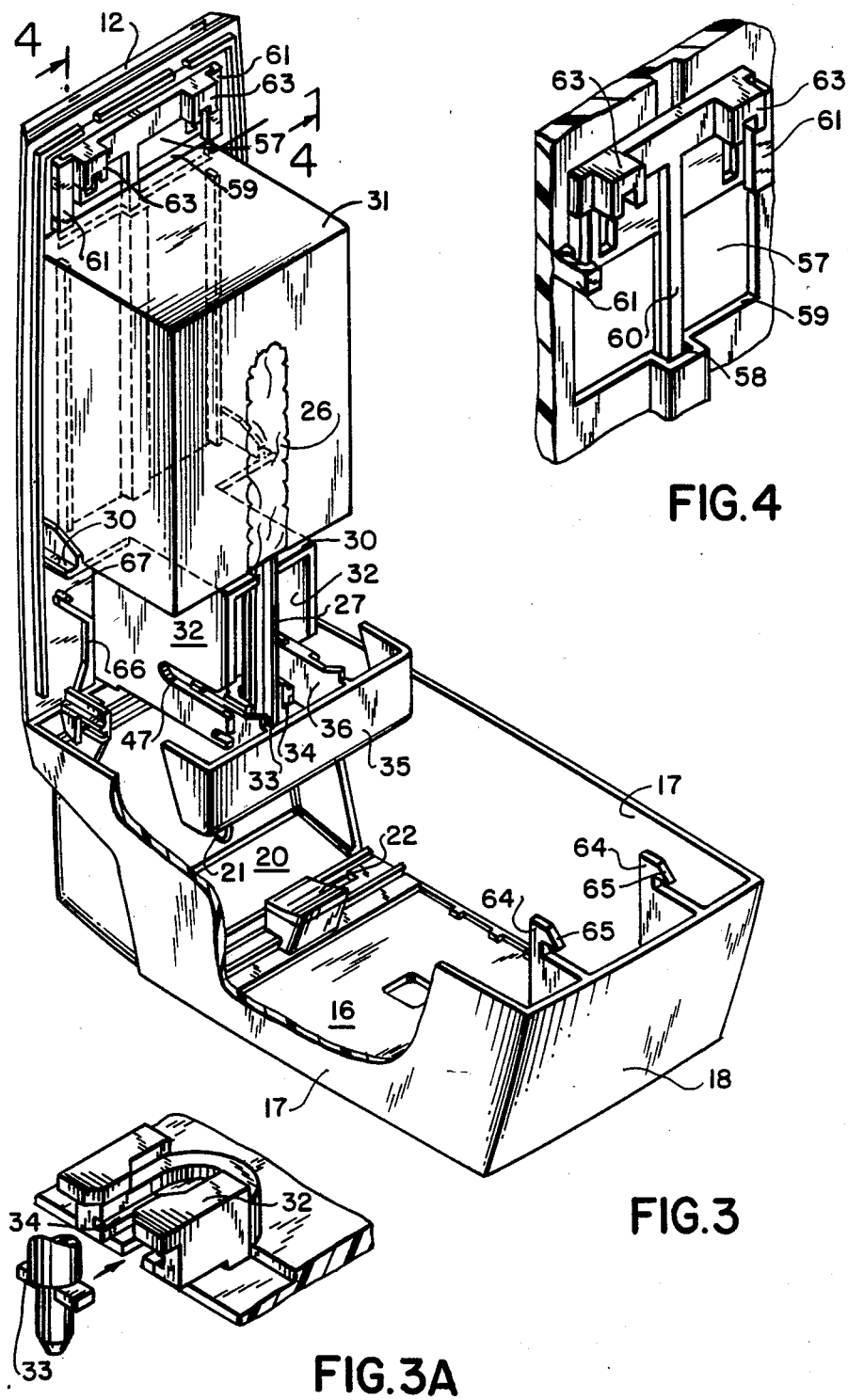

FIG. 8
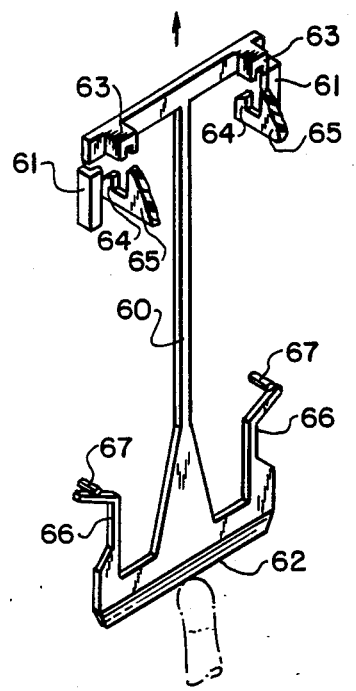
FIG. 9
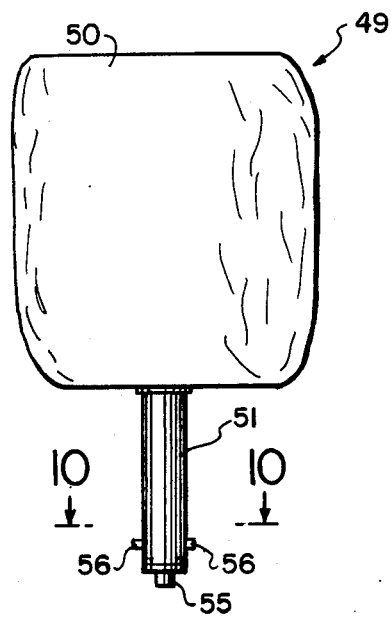
FIG. 10
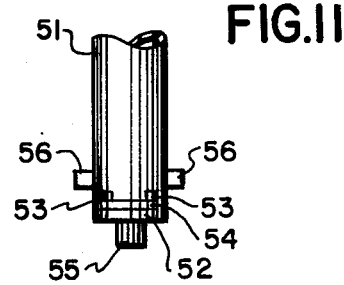
FIG. 11
FIG. 12
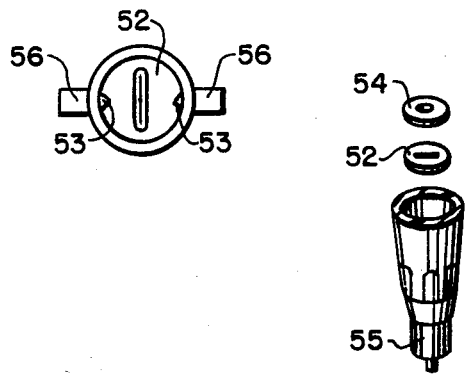

LIQUID DISPENSER

FIELD OF THE INVENTION

This invention relates to dispensers for liquid materials which are constructed to house a collapsible container containing said liquid and to dispense the liquid in predetermined amounts.

BACKGROUND OF THE INVENTION

Liquid dispensers are well known and are in substantial commercial use. Such dispensers are utilized to deliver liquid soaps, hand lotions, creams, and the like. The key requirement for such dispensers is the ability to deliver metered amounts of product upon actuation of the dispenser without leakage from the dispensing tube, contamination, difficulty in cleaning or replacement of the liquid container, entrapment of air and other undesirable features.

A variety of dispensers are disclosed in U.S. Pat. Nos. 2,113,022, 3,066,832, 3,531,021, 3,741,439, 3,881,641, 4,228,930 and 4,350,268. For example, in U.S. Pat. No. 2,113,022 a spring driven arm with an attached roller is disclosed which squeezes liquid from a resilient tube. In fact, the general approach in a number of the prior art dispensers is to permit the liquid to flow into a flexible dispensing tube from a holding container and then to expel the liquid by pivoting a handle which in turn causes a roller mechanism to move along the tube toward the outlet to force the liquid through. A further representative system is disclosed in U.S. Pat. No. 3,741,439 wherein a lever with upstream and downstream portions is moved to wedge a portion of the tubing against a wall means, the upstream portion contacting the tube prior to the downstream portion so as to expel the liquid, and a closure means is utilized to prevent leakage from the tube.

The prior art dispensers have, however, exhibited one or more disadvantages. Such disadvantages include the need for substantial pressure to expel the liquid, difficulty in replacing the liquid reservoir, the handle pulling action serving to pull the dispenser from the mounting, liquid dripping, opportunity for bacterial contamination, the potential for entrapping air, difficulty in varying the volume of delivered liquid, inability to substantially empty the liquid reservoir, and the like.

It is, accordingly, the primary object of this invention to provide an improved dispenser for delivering viscous liquids.

It is a further object to provide a dispenser which substantially overcomes the disadvantages of the prior art dispensers particularly in the areas of exerted pressure, contamination potential and ease of operation.

It is another object to provide a unitary liquid reservoir and dispensing tube for use in the dispenser.

Various other objects and advantages of this invention will become apparent from the following description thereof.

SUMMARY OF THE INVENTION

It has now been discovered that an improved dispenser can be obtained through the introduction of several key elements. Thus, the instant dispenser generally comprises a housing, a collapsible reservoir with affixed dispensing tube for retaining and delivering the liquid, a hinged rolling member which, upon actuation, contacts the upper portion of the dispensing tube and then rolls along its length to expel the desired amount of liquid, and a front bar member which is pushed to effect the movement of the rolling member. This arrangement, and particularly the bar-rolling member relationship, provides decided benefits to the dispenser. The mechanical leverage that is achieved and the corresponding conversion of linear into rotational movement allows both for a reduction in the applied pressure necessary to expel the liquid as well as for a constancy of applied pressure to facilitate delivery of the total desired amount of liquid. The pushing action on the bar prevents the dispenser from being accidentally pulled from its mounting. Inasmuch as the tube fills behind the roller, i.e. on the backstroke, a continuous source of liquid is available. Since the tube is in a constant pinched position during delivery, there is no opportunity for entrapped air, the latter serving to reduce the volume of delivered liquid and allowing for the possible transfer of bacteria into the reservoir. The configuration of the unitary nozzle tip on the dispensing tube prevents dripping and clogging thereby assuring greater cleanliness, elimination of an environment for bacterial growth and consistent performance.

BRIEF DESCRIPTION OF THE DRAWING

To the accomplishment of the above, and to such other objects as may hereinafter appear, the present invention relates to the construction of a dispenser for viscous liquids as defined in the appended claims and as described in the specification taken together with the accompanying drawings, in which:

FIG. 3 is a perspective view showing the dispenser in an open position;

FIG. 3A is a partial perspective view of the nozzle flange/slot arrangement;

FIG. 4 is a cross-sectional view taken along line 4—4 of FIG. 3 showing a portion of the locking means;

FIG. 8 is a perspective view of the key elements of the locking means;

FIG. 9 is a perspective view of a unitary reservoir-dispensing tube unit;

FIG. 10 is a plan view taken along line 10—10 of FIG. 9;

FIG. 11 is a front elevational view of the lower portion of the dispensing tube of FIG. 1; and FIG. 12 is an exploded view of the nozzle section of the tube.

DETAILED DISCLOSURE

Figures 1, 2:
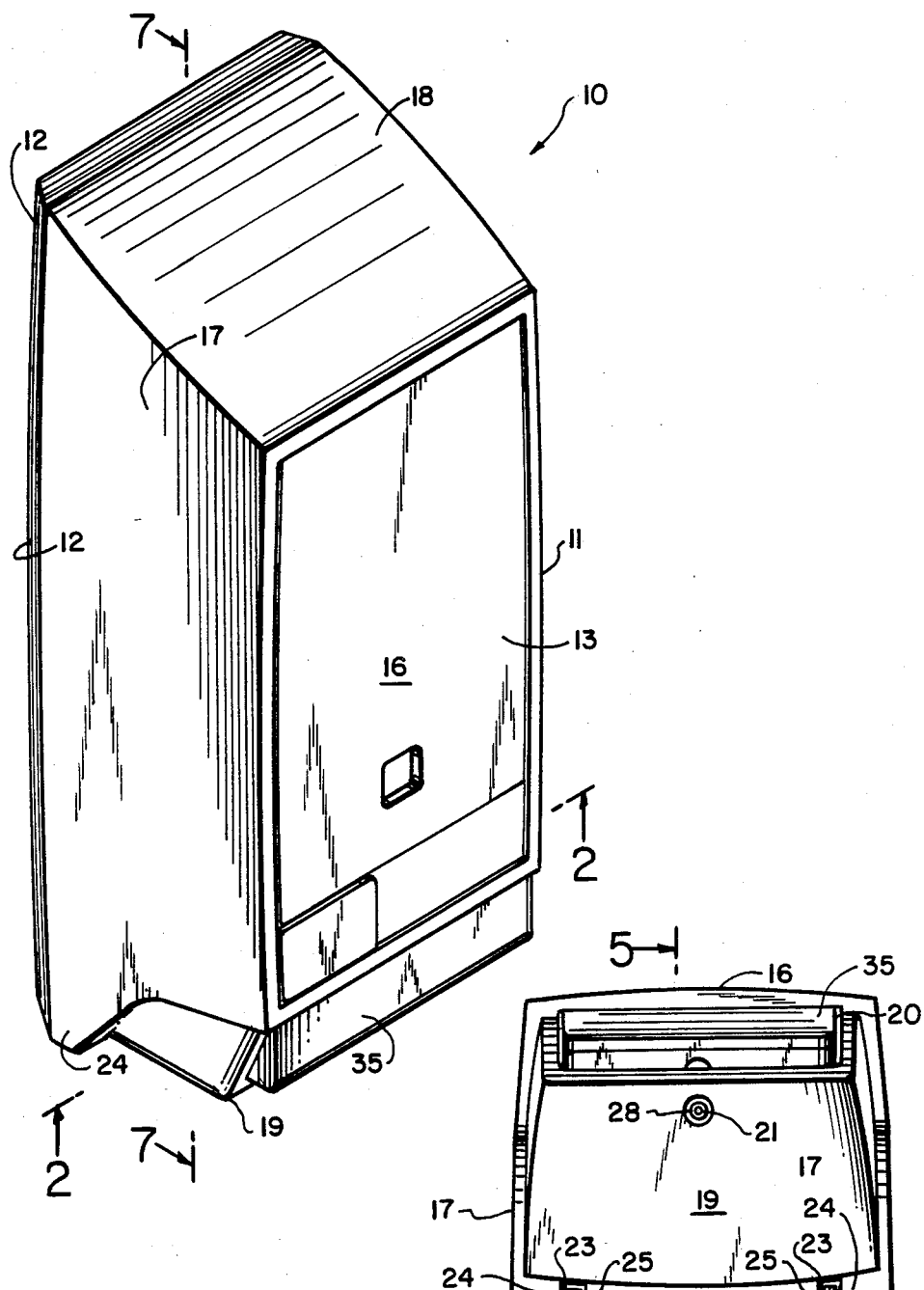
FIG. 1 is a perspective view of the dispenser of the instant invention.
FIG. 2 is a bottom view of the dispenser taken along line 2—2 of FIG. 1.
Figure 7:
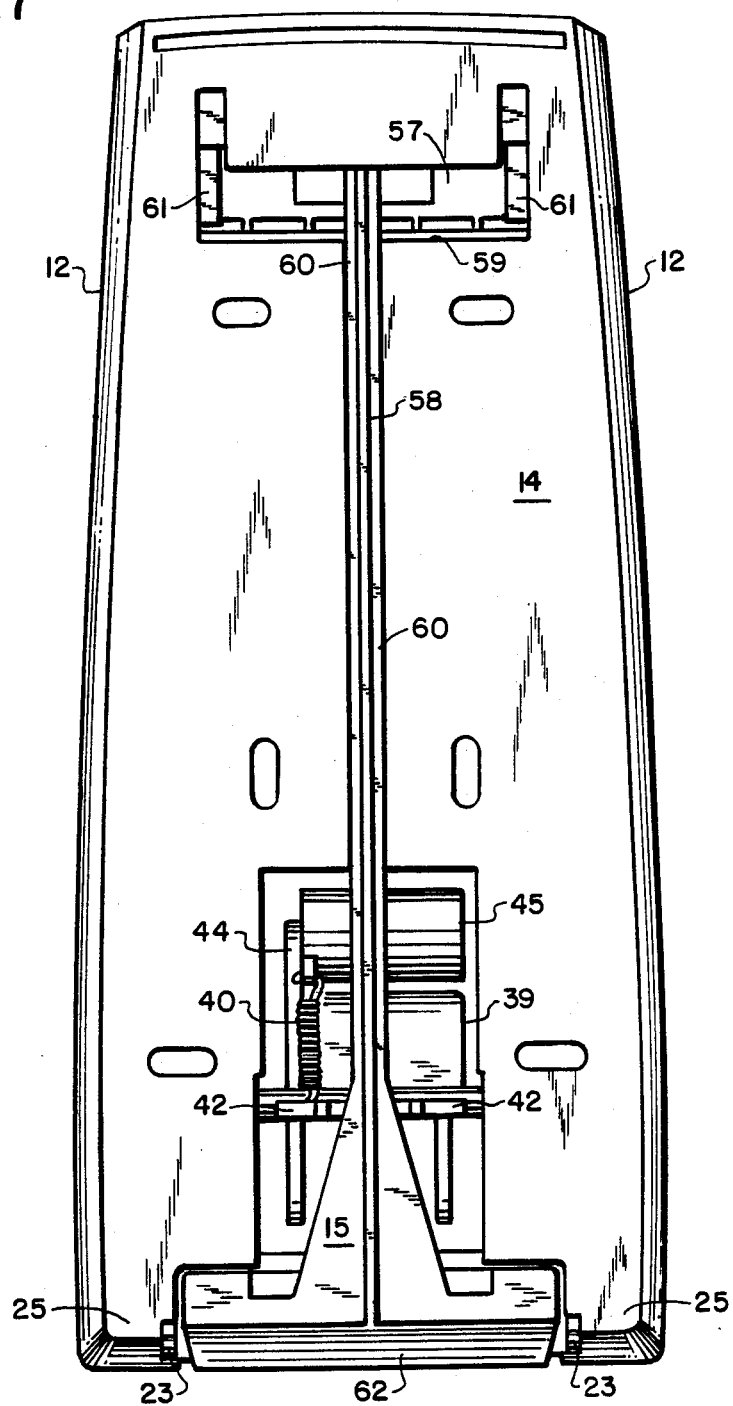
FIG. 7 is a rear elevational view of the dispenser.

Referring in detail to the drawings, FIG. 1 depicts the dispenser 10 of the present invention that includes housing 11 with a back portion 12 and a cover 13. The back portion 12 (see FIG. 7) includes a rear wall 14 that can be secured to a suitable supporting structure such as a wall by means of conventional securing means such as screws, adhesives, adhesive tapes, and the like. Locking means 15 is also positioned in rear wall 14, said locking means being described in greater detail hereinafter.

Cover 13 includes a front wall 16, spaced side walls 17 as well as a top wall 18 and a bottom wall 19. As noted in FIGS. 2 and 3, the front wall 16 has a cut-out section 20 therein while bottom 19 has a centrally located opening 21, the purpose of each of these openings also being described in greater detail hereinafter. Positioned above section 20 is protruding block 22, described hereinafter. Cover 13 is hinged to back portion 12 by means of pins 23 inserted between cover member extensions 24 and back portion extension 25.

Figure 5:
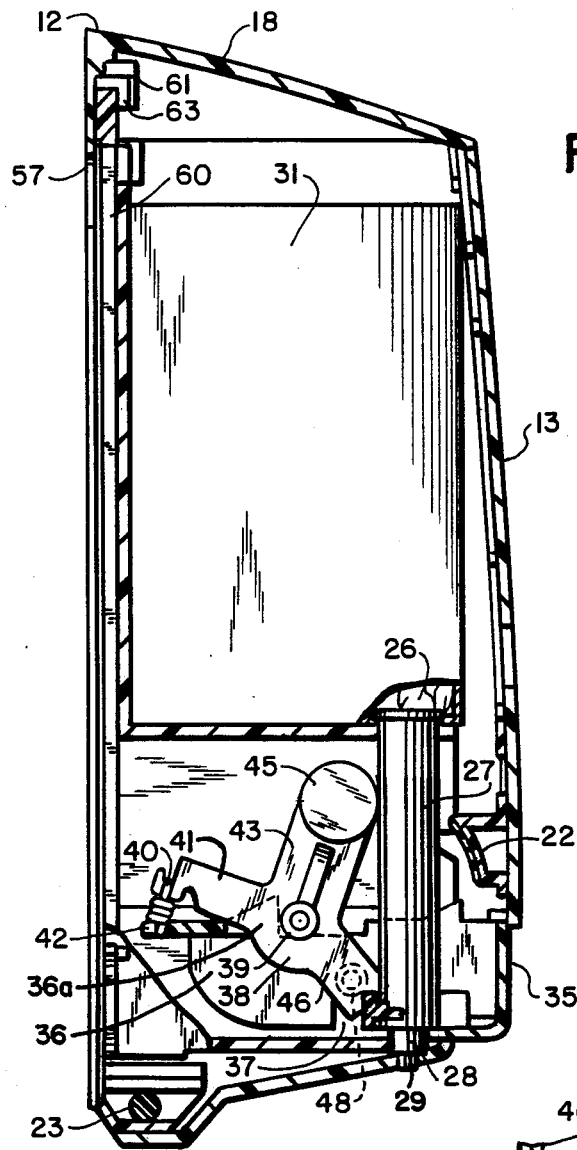
FIG. 5 is a cross-sectional view of the dispenser taken along line 5—5 of FIG. 2.

Referring to FIGS. 3 and 5, removably mounted within the housing 11 is liquid reservoir 26, preferably formed of a collapsible plastic bag, which has a quantity of flowable material disposed therein. Reservoir 26 has a flexible dispensing tube 27, preferably tapered downward, attached to the lower portion thereof. Tube 27 is arranged to receive a discharge nozzle 28 with tip 29 at the dispensing (downstream) end thereof, said nozzle 28 being either an extraneously affixed member or an integral part of said tube 27 (see FIG. 10). Valve means (not shown) positioned in the downstream end of tube 27 but set back from nozzle tip 29 combines with the small tip opening and liquid surface tension to prevent leakage of the liquid through nozzle 28 when the dispenser is not in use. A typical valve means may be any one-way valve such as a ball and spring combination.

Reservoir 26 is maintained in housing 11 by support from ledge 30 which is affixed to the interior of back portion 12. The reservoir 26 will qenerally be contained within an outer casinq 31 e.q. cardboard, in order to provide additional support for the collapsible bag.

The flexible tube 27 is held in place and positioned for discharge of material by support member 32 and by the insertion of nozzle flange 33 into slot 34. When so positioned, nozzle 28 and tip 29 protrude from opening 21, in order to dispense the liquid material from the reservoir to the user.

Figure 6:
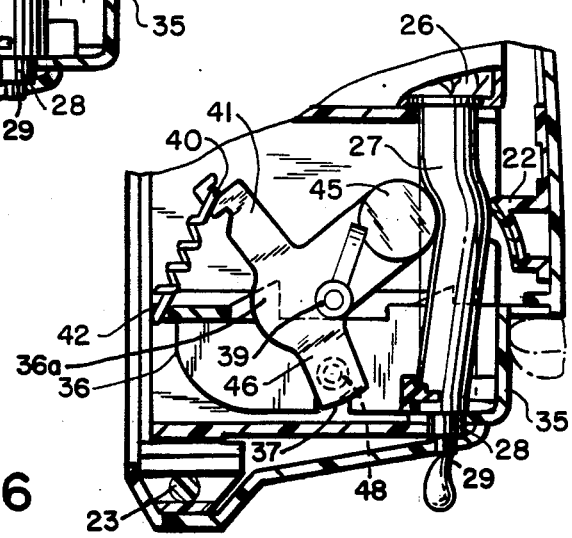
FIG. 6 is a broken away cross-sectional view of the roller-tube interrelationship when in an actuated position.

As noted in FIGS. 5 and 6, the dispensing mechanism includes front bar 35 which protrudes through cut-out section 20 when housing 11 is in a closed position. Bar 35 contains bar extension 36 attached thereto which, in turn, has notch 37 intended to capture button 48 and a back-shop portion 36a against which pivot pin 39 rests. Pivoted on support member 32 is Y-shaped cam 38 which rotates on pivot pin 39 resting against back portion 36a and disposed at the closed end of track 47. Spring 40 is supported between one arm 41 of the Y-shaped cam 38 and spring retention means 42 positioned at the end of extension 36, the purpose of spring 40 being described hereinafter. The other arm 43 of the Y carries a pin 44 having a roller 45 mounted thereon, the roller 45 being adapted and positioned to engage the flexible tube 27 such that the liquid material will be dispensed when the dispenser 10 is properly actuated. The relaxed position of roller 45 is in a slightly pinched engagement with tube 27 in order to prevent air entrapment.

From the foregoing, it will be seen that when dispenser 10 is being used, the reservoir 26 containing the material to be dispensed is positioned in housing 11 as shown in FIG. 5. Initially, bar 35 is in the position shown in FIG. 5 and when pressure is applied thereto, bar 35 is in the position show in FIG. 6. As pressure is applied to bar 35, bar extension 36 will move inwardly in track 47 thereby moving button 48 affixed to leg 46 of the Y-shaped cam 38 so that cam 38 rotates and roller 45 is urged against flexible tube 27 at the upstream end thereof. The pressure of roller 45 forcing tube 27 against block 22 closes off said tube 27. The pressure at the initiation of the stroke is necessarily greater than at any other point of the cycle in order to close off the tube 27 and also to provide sufficient velocity to the liquid as compensation for the short stroke. The continuous application of pressure causes the roller to rotate around pin 44 and move down the tube 27 to the downstream end thereof. As the roller 45 progresses along the tube 27, it continues pressing tube 27 against block 22 so that as a result, the liquid contained in the tube is discharged through nozzle tip 29. It is to be noted that the arc of movement of roller 45 is not parallel to but diverges from the curvature of block 22, this difference facilitating the discharge of the liquid. At the end of the forward stroke and the release of bar 35, the roller 45 and cam 38 will return to their original positions due to the action of spring 40. Thus, a predetermined amount of liquid will be dispensed each time for each operating stroke inasmuch as the length of tube 27 squeezed is uniform for each operating stroke. The tube 27 returns to its substantially rounded shape causing a slight vacuum therein such that tube 27 fills almost instantaneously behind roller 45 and the next shot of product can be discharged immediately. As previously noted, roller 45 does not completely disengage from tube 27 so as to substantially prevent the entrapment of air in tube 27.

The parts of the dispenser can be made from any suitable material. The reservoir 26 is generally of the disposable type. Thus, the bag collapses as the liquid is dispensed and then can be readily replaced when empty by a new reservoir. The tube 27 is made of a flexible material that is characterized by its recovery characteristics. The collapsible reservoir and flexible tube allow for ease in shipment and storage.

Replacing reservoir 26 merely involves opening back portion 12 by pivoting it around pin 23 so that it can be swung open, removing the empty reservoir, disengaging nozzle flange 33 from slot 34, then inserting a full reservoir in the same manner and locking the dispenser.

The present invention is adapted to be used in a wide variety of applications where it is required that a metered amount of product be released upon each actuation of the dispensing mechanism. The device or system is especially suitable for use in an institutional environment inasmuch as it offers a low-cost bulk package of product. Also, the package is disposable. The device can be actuated through very simple means and occupies a minimum amount of space in its emptied condition, and it is especially suitable to meet environmental requirements. Furthermore, the product contained within the package never contacts any of the operating mechanism so that there is provided a highly sanitary method of dispensing the product. Likewise, the bar/cam/roller assembly is preferably constructed as a single, independent unit so that it can be disengaged from the dispenser and removed via track 47 for ready cleaning and replacement of parts. The dispensing system can be in the form of a wall mounted unit, or the device can be mounted on a pedestal, or it can be console mounted or suspended in an otherwise suitable location.

While the dispenser will generally be constructed and operated as described hereinabove, various optional features and/or constructions can be utilized. For example, as noted in FIG. 10, an essentially one-piece fluid reservoir 49 may be used to decided advantage. Thus, the reservoir 49 comprises liquid-containing bag 50 with flexible tube 51 as an integral part thereof. As noted in FIGS. 10-12, the downstream end of tube 51 contains a slit-valve 52 held in place by detent members 53. Although the depicted valve 52 exhibits a single slit, multiple slits may be utilized, e.g. cross-hairs. Correspondingly, a retention washer or reinforcement ring 54 may be placed over valve 52 and under detent member 53 in order to maintain the valve in position above nozzle tip 55. The valve 52 is preferably set back from the opening in tip 55 to facilitate delivery of the liquid. As the roller 45 proceeds down tube 51, the slit-valve 52 is forced to open to allow the passage of the fluid material. When pressure is removed and the roller returns to its original position, slit-valve 52 closes preventing the introduction of air and sealing the tube to prevent leakage of the next amount of fluid material. Tube 51 likewise exhibits flange 56, either an integrally-formed part of the reservoir or an independent piece, which fits into slot 34 in order to assist in the positioning of the reservoir and flexible tube. This optional construction is very advantageous inasmuch as it minimizes leakage, contamination, air introduction, microorganism entry and the like.

Locking means 15 may simply consist of a latching mechanism. However, in order to insure greater security and minimize tampering, locking means 15 preferably combines a latching mechanism and movement of bar 35 in order to both open and close dispenser 10. With regard to the latching mechanism, reference is made to FIGS. 3, 4, 7, and 8, whereby in back portion 12, cut-out section 57, lock channel 58, shoulder 59 and a cut-out portion at the bottom of back 12 provide the movement path and retention means for latch 60. In addition, retention members 61 provide a further path for the movement of the upper portion of latch 60. Latch 60 comprises at its lower end push member 62 and at its upper end receiving means 63. Thus, in order to open the dispenser, it is required to push member 62 thereby raising latch 60 and disengaging receiving means 63 from hooks 64 fixedly attached to the interior of cover 13. Likewise, closing the dispenser involves pivoting back portion 12 toward cover 13 such that the beveled edges 65 on hooks 64 will encounter receiving means 63 thereby raising latch 60 and permitting hooks 64 to be engaged in receiving means 63. Flexible members 66 in contact with stops 67 provide the spring-like action to permit the raising and locking action. A further advantage of the instant dispenser is that latch 60 is an independent unit, totally removable to facilitate molding and assembly. It should be noted, however, that bar 35 is positioned relative to cut-out section 20 such that bar 35 would not clear the upper edge of section 20 even when latch 60 is open. This construction provides a safety measure to thwart tampering with the dispenser. Accordingly, bar 35 must be pushed slightly inward in order to allow the bar 35 to clear the open section 20. Thus, both steps are necessary to open the dispenser, with the pushing of bar 35 also being required in order to close the dispenser.

While the amount of dispensed liquid can be controlled by the length of the dispensing tube, which might thus require providing interchangeable tubes of varying length, such an approach does not provide adequate flexibility of use. Accordingly, various stops (not shown) can optionally be placed on track 47 in order to provide such flexibility. Thus, bar 35 can be pushed to the end of track 47 to provide a full stroke for release of the entire amount of liquid in tube 27 or can be pushed to intermediate stops to provide shorter strokes and release of smaller amounts of liquid. Likewise, a rotatable stop can be positioned at the forward end of track 47 to vary the distance of travel of bar 35.

Summarizing, this invention provides a novel dispenser for liquid materials. Variations and modifications of the structural elements and arrangements may be made without departing from the scope of the invention as defined by the following claims.

What is claimed is:

1. A dispenser for discharging liquid materials comprising:
   a back portion;
   a cover hingedly connected to said back portion and including a top wall, side walls, a front wall having a cutout section; and a bottom wall having an opening therein;
   a reservoir for containing the liquid, said reservoir removably mounted within the dispenser;
   a flexible tube connected at its upstream end to the reservoir and containing a nozzle tip at its downstream end projecting through the opening of the bottom wall;
   support means for supporting the reservoir and for retaining the flexible tube;
   a push bar movably connected to the support means and projecting through the cutout section of the front wall, said push bar comprising an internally disposed extension having an open notch;
   a Y-shaped cam rotatable on a pivot pin, said cam comprising a leg bearing a button positioned in the open notch of the push bar extension;
   a roller positoned on an arm of the Y-shaped cam, said roller selectively engaging the flexible tube; and
   a spring positioned on the other arm of the Y-shaped cam connecting said cam to the push bar extension;
   whereby actuation of the push bar progressively urges the roller into contact with the flexible tube and moves said roller from the upstream end of said tube to the downstream end thereof in order to discharge liquid through the nozzle, and whereby the spring urges said roller back to its original position.

2. The dispenser of claim 1, wherein said reservoir is a collapsible, disposable plastic bag.

3. The dispenser of claim 1, wherein the flexible tube has a flange positioned above the nozzle tip and wherein the support means has a slot, said flange being inserted into said slot to appropriately position the flexible tube for discharge of the liquid material.

4. The dispenser of claim 1, wherein the pivot pin is positioned movably in a horizontal track on the support means.

5. The dispenser of claim 4, wherein the push bar, cam, roller and spring are constructed as an independent, integral unit, which unit can be removed via the horizontal track intact from said dispenser.

6. The dispenser of claim 1, wherein a block having a curved surface with a protruding upper edge is positioned on the interior of the front wall of the cover above the cut-out section, the flexible tube contacting said protruding edge at the onset of contact between the roller and the flexible tube.

7. The dispenser of claim 6, wherein the arc of movement of the roller diverges from the curvature of the block surface.

8. The dispenser of claim 1, wherein the roller is in slightly pinched engagement with the flexible tube when it is in non-actuated position.

9. The dispenser of claim 1, wherein the back portion contains locking means to engage the cover and maintain the dispenser in closed position.

10. The dispenser of claim 9, wherein said locking means comprises a latch movable in a channel on the back portion, said latch having a push member at the bottom end thereof and receiving means at the upper end thereof.

11. The dispenser of claim 10, wherein hooks are attached to the interior of the cover and engage said receiving means when the dispenser is in a closed position.

12. The dispenser of claim 1, wherein the push bar is positioned relative to the cut-out section such that it must be depressed in order to clear said section when opening or closing the dispenser.

13. The dispenser of claim 1, wherein the reservoir, flexible tube and nozzle comprise an integral unit.

14. The dispenser of claim 13, wherein a slit valve is positioned in the flexible tube at the downstream end thereof spaced from the nozzle.

15. The dispenser of claim 14, wherein said valve is maintained in position by detent members formed at the downstream end of the tube but spaced therefrom.

* * * * *